Figure 1:
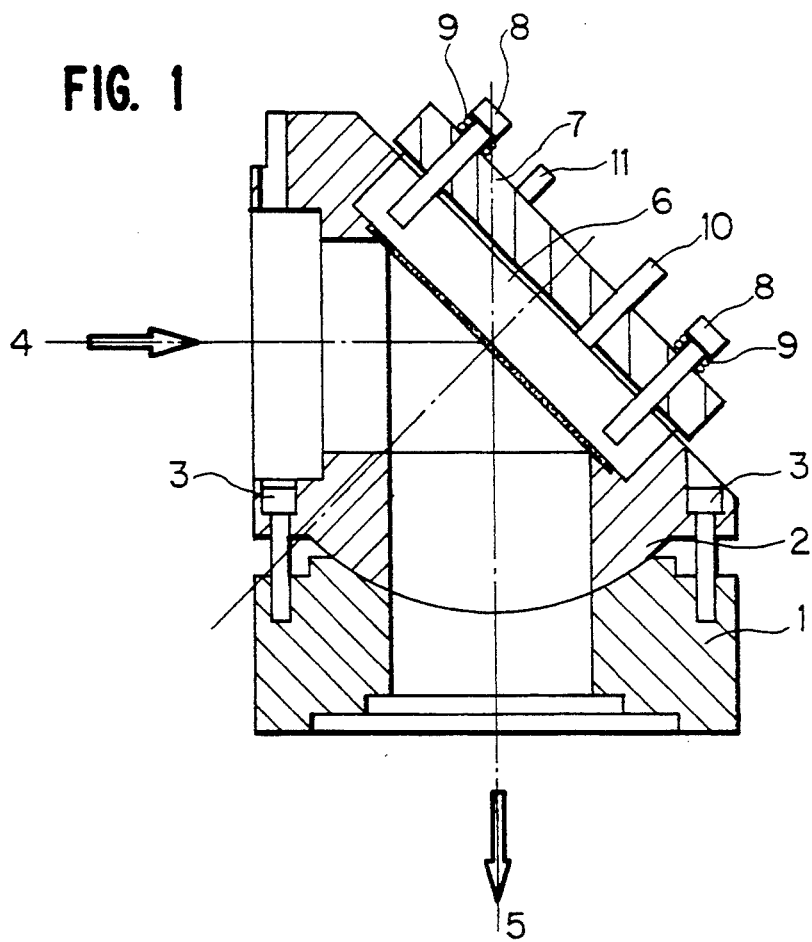

United States Patent [19]

Gnann

[11] Patent Number: 5,418,652
[45] Date of Patent: May 23, 1995

[54] DEFLECTION MIRROR HOUSING FOR LASER MATERIAL-MACHINING SYSTEMS AND BEAM SEPARATING FILTER

[75] Inventor: Rüdiger A. Gnann, Ravensburg, Germany

[73] Assignee: Maschinenfabrik Karl H. Arnold GmbH & Co. KG, Ravensburg, Germany

[21] Appl. No.: 949,856

[22] Filed: May 14, 1993

[30] Foreign Application Priority Data

May 28, 1990 [DE] Germany .............. 40 17 152.3

[51] Int. Cl.6 ............................................. G02B 7/182
[52] U.S. Cl. ........................... 359/871; 359/845; 384/208; 248/481
[58] Field of Search ............. 359/845, 871, 838; 384/2, 208; 248/474, 476, 479, 481

[56] References Cited

U.S. PATENT DOCUMENTS

| | | | |
|---|---|---|---|
| 3,836,236 | 9/1974 | Kirk et al. | 359/845 |
| 4,422,725 | 12/1983 | Prewo | 359/846 |
| 4,707,585 | 11/1987 | Monteith et al. | 219/121.79 |
| 5,208,439 | 5/1993 | Arai | 359/845 |

FOREIGN PATENT DOCUMENTS

| | | |
|---|---|---|
| 0159723 | 10/1985 | European Pat. Off. . |
| 0179426 | 4/1986 | European Pat. Off. . |
| 976222 | 5/1963 | Germany . |
| 2312711 | 9/1974 | Germany . |
| 2363765 | 6/1975 | Germany . |
| 62-28094 | 2/1987 | Japan . |
| 1215487 | 8/1989 | Japan . |
| WO9002627 | 3/1990 | WIPO . |

Primary Examiner—Georgia Y. Epps
Assistant Examiner—Thomas Robbins
Attorney, Agent, or Firm—Sughrue, Mion, Zinn, Macpeak & Seas

[57] ABSTRACT

In a deflection mirror housing for laser material-machining systems and a beam separating filter with such a deflection mirror housing, the housing is composed of two parts comprising a housing upper part (2) supporting a deflection mirror (6) and a housing lower part (1) in the form of a spherical cup, an inlet or outlet opening for the laser beam is provided in the housing lower part (1) formed as a spherical cup and in the housing upper part (2), the deflection mirror (6) is arranged in the housing upper part (2) to be removable from the outside without changing its adjustment, the center of the spherical cup lies in the mirror plane, and the deflection mirror (6) is adjustable by pivoting the housing upper part (2) with respect to the housing lower part (1).

11 Claims, 2 Drawing Sheets

DEFLECTION MIRROR HOUSING FOR LASER MATERIAL-MACHINING SYSTEMS AND BEAM SEPARATING FILTER

The invention relates to a deflection mirror housing comprising a deflection mirror for laser material-machining systems, a housing lower part formed as a spherical cup, the center of the spherical cup lying in the mirror plane, and a housing upper part supporting the deflection mirror by means of a support surface corresponding to the spherical cup, and in which housing the deflection mirror is adjustable by pivoting the housing upper part with respect to the housing lower part in the spherical cup, and relates to a beam separating filter comprising such a deflection mirror housing.

Such a deflection mirror housing is known from WO-A-90/02627.

A one-part deflection mirror housing is also known from JP-A-62-28094 comprising inlet and outlet openings and a deflection mirror which is arranged to be removable from the outside of the housing without changing its adjustment.

In known deflection systems for the laser beam in laser material-machining systems, the deflection mirror is screwed into fixtures in plates, which lie in the mirror plane (enclined at 45°) and these mirrors are displaced in membranes or ball work pans by means of adjusting screws with respect to the housing of the deflection mirror. The mirror is therefore always screwed into an adjustable support and fixed by means of this to the housing. When a mirror is to be replace, this always necessitates a readjustment of the course of the beam.

In the known systems, one always operates with adjustment devices provided in the mirror plane, wherein, in the case of the application of ball work pans, the center of the pivot axis lies outside the beam axis and, therefore, the center of rotation does not lie in the mirror plane. In membrane adjustments, the beam axis is difficult to control by adjustment and can also be displaced.

It is also known that the deflection mirrors are secured onto plates which themselves are supported on setscrews in the housing.

Finally, a bearing for a pivotable mirror is known from DE 23 63 765 A1, in which the mirror is arranged in such a manner on the circular surface of a ball section that the center of the ball lies on the mirror upper surface. The ball section is supported in a cup of the corresponding diameter. The mirror is movable by means of an adjustment device which is mounted on the supported spherical cup and effective in a plane parallel to the zero setting of the mirror. Such a spherical cup arrangement offers practically no advantage with respect to a mirror membrane support. In particular, the mirror thickness and surface eveness influence the adjustment, the center must be newly found following an exchange of components in the adjustment mechanics, an angular error is unavoidable in the case of two setting possibilities, the mechanical effort is very high and the adjustment necessitates experienced personnel and the changing of the mirror requires considerable readjustment.

It is the object of the invention to provide a deflection mirror housing for laser material-machining systems which is geometrically and constructively arranged in such a manner that the mirror plane is fixed in and with respect to the housing and that only the housing therefore determines the beam geometry so that an exchange of mirror is possible without changing the adjustment geometry.

In this case, the housing should be arranged such that a deformation of the mirror, which would impede the focusing capability of the laser beam, can be safely avoided. Furthermore, the mirror plane should not be displaced by the adjustment from the axis to lie parallel, on account of which the raw beam would no longer centrically enter into the focusing optics.

This object of the invention is solved according to the invention with a deflection mirror housing of the type initially described in that the spherical cup support of the housing parts is located in a region in front of the surface of the deflection mirror, both housing parts are provided in the region of the spherical cup support with mutually opposing openings for the laser beam, and the deflection mirror is inserted in a precisely fitting manner into the housing upper part (2) in the mirror plane to be easily accessable from the outside of the housing, and is held therein.

In this case, it is essential that the center point or center of rotation of the spherical cup of the housing lower part lies exactly in the mirror plane, and that the adjustment plane is exclusively generated by the mirror plane itself.

The position of the deflection mirror with respect to the housing upper part is determined by mirror support surfaces for the mirror upper surface in the housing upper part. Thus, an exchange of the mirror, which is necessary at regular intervals for cleaning purposes, is possible without the adjustment geometry being changed, as the geometry is determined by the mirror support surface in the housing or is formed by the housing itself. The removal of the mirror from the housing is very easy, as the mirror is merely placed therein.

In the case of adjustment, the mirror never needs to be moved with respect to the housing upper part.

By establishing the mirror upper surface in the housing upper part, an exact plane parallelism of the mirror rear side is not necessary for an exact adjustment. The geometrical requirements placed on the mirror are only limited to the mirror upper surface, i.e. the optical side, and an exact diameter as well as thickness, plane parallelism and the like bear no significance.

Advantageously, respectively two adjustment screws are provided in and transversely to the beam axis direction of the laser beam between the housing upper part and the housing lower part by means of which the housing upper part can be pivoted on the housing lower part about the spherical center lying in the mirror plane. Such a clear arrangement of the adjustment plane and the functionally clearly recognizable and measurable geometry offer advantages in manufacture (two base parts) and in industrial use. The required adjustment accuracy of less than or equal to 0.001 rad can also be easily achieved by inexperienced personnel.

Usefully, the support of the deflection mirror and, if necessary, a cooling plate on the rear side thereof are formed in such a manner that only forces can arise which are small and parallel to the mirror plane, on account of which a deformation of the mirror upper surface is avoided.

Advantageously, a cooling plate is releasably mounted to the rear side of the deflection mirror, or direct cooling by fluid is provided. The direct cooling by fluid from the rear is possible, as the rear side of the mirror can be exposed, on account of which a hydraulic prebiasing of the mirror is also made possible.

Advantageously, electrical signal transmitters for safety functions, such as thermo-probes, are integrated into the cooling plate, wherein the mirror can be monitored, for example, for a constant temperature of 20°+1° C.

It is also of advantage in the inventive deflection mirror housing that the adjustment screws for setting the optical axis lie in a plane which is arranged parallel to the incident or emerging beam axis, on account of which the association of the adjustment requirements is directly recognizable. Finally, the geometric arrangement can be applied for any desired deflection angle, wherein horizontal deflection is also particularly considered.

In the manufacture of small workpieces by means of laser welding, the operation is carried out alternatively at at least two stations. In this case, the laser beam is always switched between both stations, a partial exchange by means of a rotating plate taking place at the non-operating station during the idle time. A beam separating filter is necessary for the switching by means of which the switching ensues in the smallest time possible. In known methods, the mechanical lock on the laser beam source is closed, a mirror housing is displaced and the lock is openend again. Known laser beam source locks operate too slowly in this case at time increments of appoximately 0.3 to 0.4 sec., if the main incremental welding times are 1 to 2 sec.. Furthermore, mechanical locks rarely endure more than 1 to 2 million switchings before they are worn out. Consequently, this known system is not suitable for a quick beam separating filter.

Therefore, a further embodiment of the invention relates to a beam separating filter for laser material-machining systems with an inventive deflection mirror housing in which one side of the deflection mirror is exposed in the housing upper part, the laser beam inlet opening in the housing upper part is enlarged in the direction beyond the exposed mirror edge, and the deflection mirror housing is designed to be displacable in the direction towards and back from the enlargment of the laser beam inlet opening. In this case, the deflection mirror is usefully arranged asymmetrically in the housing upper part.

In such a beam separating filter, the raw beam can be guided excentrically onto the mirror respectively according to the beam diameter, while the beam can be guided without influence through the deflection mirror housing after switching to transmission via an optimized dispacement path by displacing the deflection mirror housing on guides with a cylinder or spindle drive. The mechanical stiffness and shape stability of the housing is ensured.

Advantageously, a forwardly supported, fluid-cooled targeting aperture adapted to the beam geometry and the exposed mirror edge is secured in thermally insulated manner on the housing upper part on the laser beam inlet side. Thus, with an open laser source lock, the beam separating filter can be switched without the deflection mirror housing heating up and therefore detectibly changing due to scattered radiation as a result of reflections at the mirror edge.

Usefully, the stroke of the housing displacement is approximately 10 mm greater than the raw beam diameter, as a result of which switching times of 0.2 sec. may be achieved with a raw beam diameter of 45 mm, i.e. the housing can be displaced from one end position to the other end position within approximately 0.2 sec..

This is particularly advantageous in the case of short welding cycles with machines comprising two or more stations, as the effective time of use of the laser material-machining facility is considerably increased on account of this.

It is further more of advantage in the inventive beam separating filter that, on account of the displacement speed with an open beam source lock, a soft uncoupling and coupling of the beam from or with the workpiece may be realized, since, in switching with an open laser source lock, the beam energy occurs separately at two workpieces, diminishes at the first work piece and increases at the second workpiece during the displacement. On account of the gentle uncoupling of the laser beam at the first workpiece, in the case of laser beam welding, crater formation at the weld seam end can be prevented and an improvement in quality can therefore be achieved.

Finally, the inventive deflection mirror housing includes the advantage that, for example, copper deflection mirrors which have signs of wear, such as penetrations by burning and shape errors in the form of, for example, scratches on the upper surface on account of use, can be remachined, as the mirror thickness does not have any influence on the adjustment position.

Figure 2:
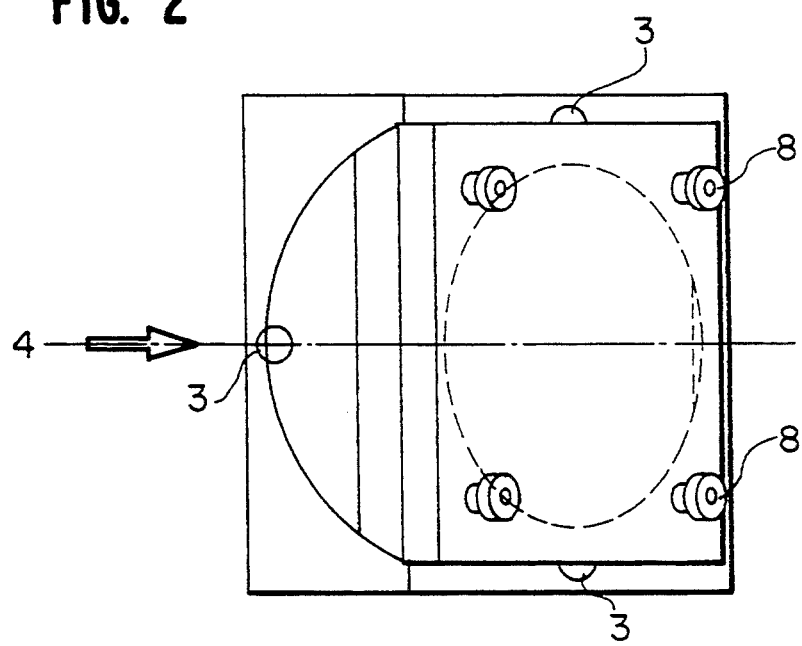
Figure 3:
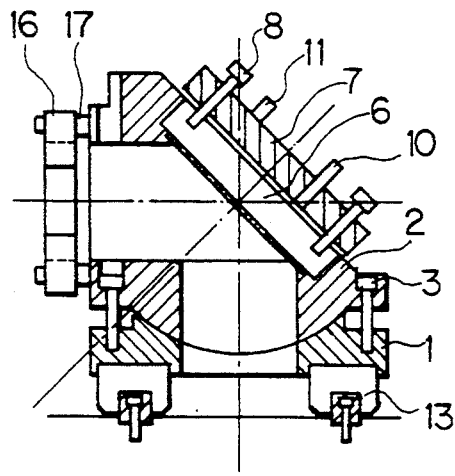
Figure 4:
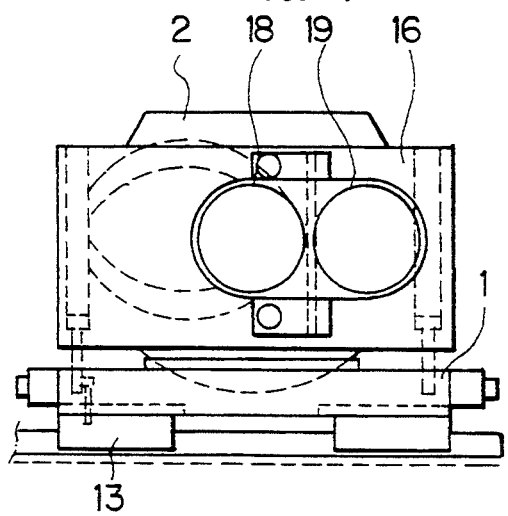
Figure 5:
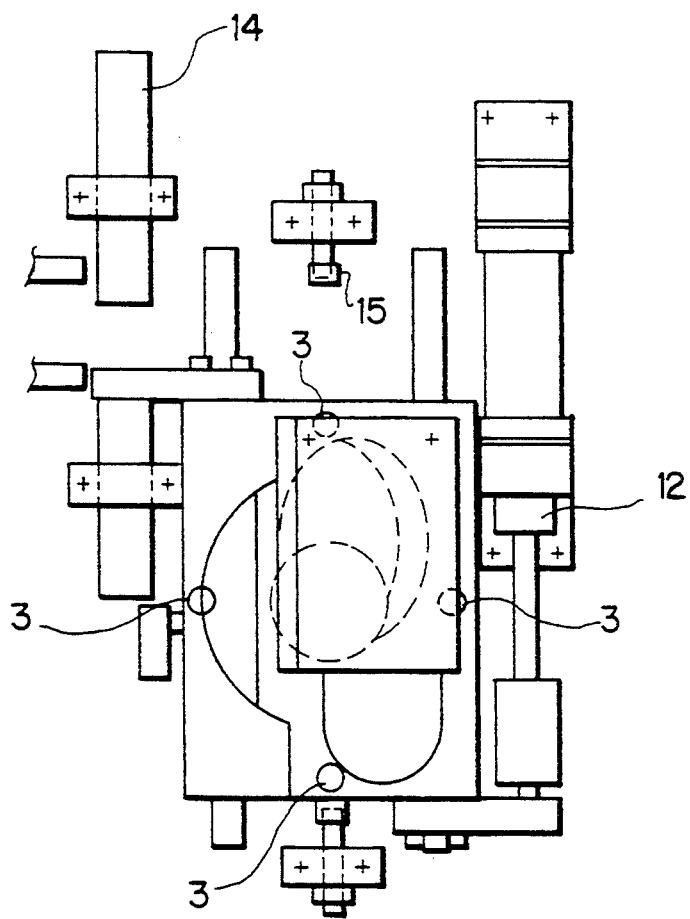

The invention is described in more detail in the following by way of example and with respect to the drawings, in which:

FIG. 1 shows a lateral cross-sectional view of an inventive deflection mirror housing, FIG. 2 shows a plan view of the deflection mirror housing according to FIG. 1, FIG. 3 shows a lateral cross-sectional view of an inventive beam separating filter, FIG. 4 shows an elevation view of the beam separating filter according to FIG. 3, and FIG. 5 shows a plan view of the beam separating filter according to FIG. 3.

The inventive deflection mirror housing shown in FIG. 1 and 2 has a housing lower part 1 in the form of a spherical cup and a housing upper part 2 arranged thereon to be pivotable in the spherical cup. Two adjustment screws 3 are respectively provided in and transversely to the beam axis direction of the laser beam between the housing upper part 2 and the housing lower part 1. The laser beam impinges in the direction of the arrow 4 into the deflection mirror housing and emerges from this in the direction of the arrow 5.

A deflection mirror 6 is inserted, in a precisely fitting manner and to be easily accessible from the outside, into the housing upper part 2 and held therein. A cooling plate 7 is releasably mounted to the rear side of the deflection mirror 6 by means of screws 8 and pressing springs 9.

A thermo-probe 10 is integrated into the cooling plate 7, while a connection for water cooling is denoted with 11.

In FIGS. 3 to 5, an inventive beam separating filter is shown comprising a deflection mirror housing in which the corresponding elements are denoted with the same reference signs as in FIGS. 1 and 2. In this, one side of the deflection mirror is arranged to be exposed in the housing upper part 2, and the laser beam inlet opening in the housing upper part 2 is enlarged in the direction beyond the exposed mirror edge. The deflection mirror housing is arranged to be displacable by means of a displacement cylinder 12 and guides 13, in the direction towards the enlargement of the laser beam inlet opening and back, against a shock absorber 14 and a fixed stop 15.

A liquid cooled targeting aperture 16 supported in front on the laser beam inlet side and adapted to the beam geometry and the exposed mirror edge is fastened in a thermally insulated manner via an insulator 17 to the housing upper part 2. The enlarged opening of the targeting aperture 16 is clearly recognizable in FIG. 4.

The deflection mirror is asymmetrically arranged in the housing upper part 2 in this case. Also denoted in FIG. 4 with 18 is the outline of the incident raw beam in the deflection position and, with 19, the outline of the incident raw beam in the transmission position of the deflection mirror housing.

I claim:

1. Deflection mirror housing having a deflection mirror for laser material-machining systems, comprising:
    a housing lower part formed as a spherical cup having a center lying in the mirror plane,
    a housing upper part supporting the deflection mirror by means of a support surface corresponding to the spherical cup, and
    the deflection mirror being adjustable by pivoting the housing upper part with respect to the housing lower part in the spherical cup,
    wherein the spherical cup support of the housing parts is located in a region in front of a front surface of the deflection mirror,
    both housing parts are provided in the region of the spherical cup support with mutually opposing openings for the laser beam, and
    the deflection mirror is inserted in a precisely fitting manner into the housing upper part in the mirror plane to be easily accessible from the outside of the housing, and is held therein.

2. An apparatus according to claim 1, wherein a plurality of adjustment screws are provided in and transversely to the beam axis direction of the laser beam between the housing upper part and the housing lower part.

3. An apparatus according to claim 1, wherein the position of the deflection mirror with respect to the housing upper part is established by the mirror supporting surface for the mirror front surface in the housing upper part.

4. An apparatus according to claim 1, wherein the support of the deflection mirror and a cooling plate are arranged in such a manner on the rear side thereof that only forces can arise which are small and parallel to the mirror plane.

5. An apparatus according to claim 1, wherein a cooling plate is releasably mounted on a rear side of the deflection mirror.

6. An apparatus according to claim 5, wherein electrical signal transmitters for safety functions comprising thermo-probes are integrated in the cooling plate.

7. A beam separating filter for laser material-machining systems comprising a deflection mirror housing according to claim 1,
    wherein one side of the deflection mirror is arranged to be exposed in the housing upper part;
    the laser beam inlet opening in the housing upper part is enlarged in a direction beyond an exposed mirror edge, and
    the deflection mirror housing is displaceable in the direction of the enlargement of the laser beam inlet opening and back.

8. A beam separating filter according to claim 7, wherein the deflection mirror is asymmetrically arranged in the housing upper part.

9. A beam separating filter according to claim 7, wherein a forwardly supported, liquid cooled targeting aperture adapted to the beam geometry and the exposed mirror edge is secured in a thermally insulated manner on the housing upper part on the laser beam inlet side.

10. A beam separating filter according to claim 7, wherein the stroke of the housing displacement is approximately 10 mm greater than the raw beam diameter.

11. A beam separating filter according to claim 7, wherein the housing is displaceable from one end position to the other end position within approximately 0.2 sec.

* * * * *